UNITED STATES PATENT OFFICE.

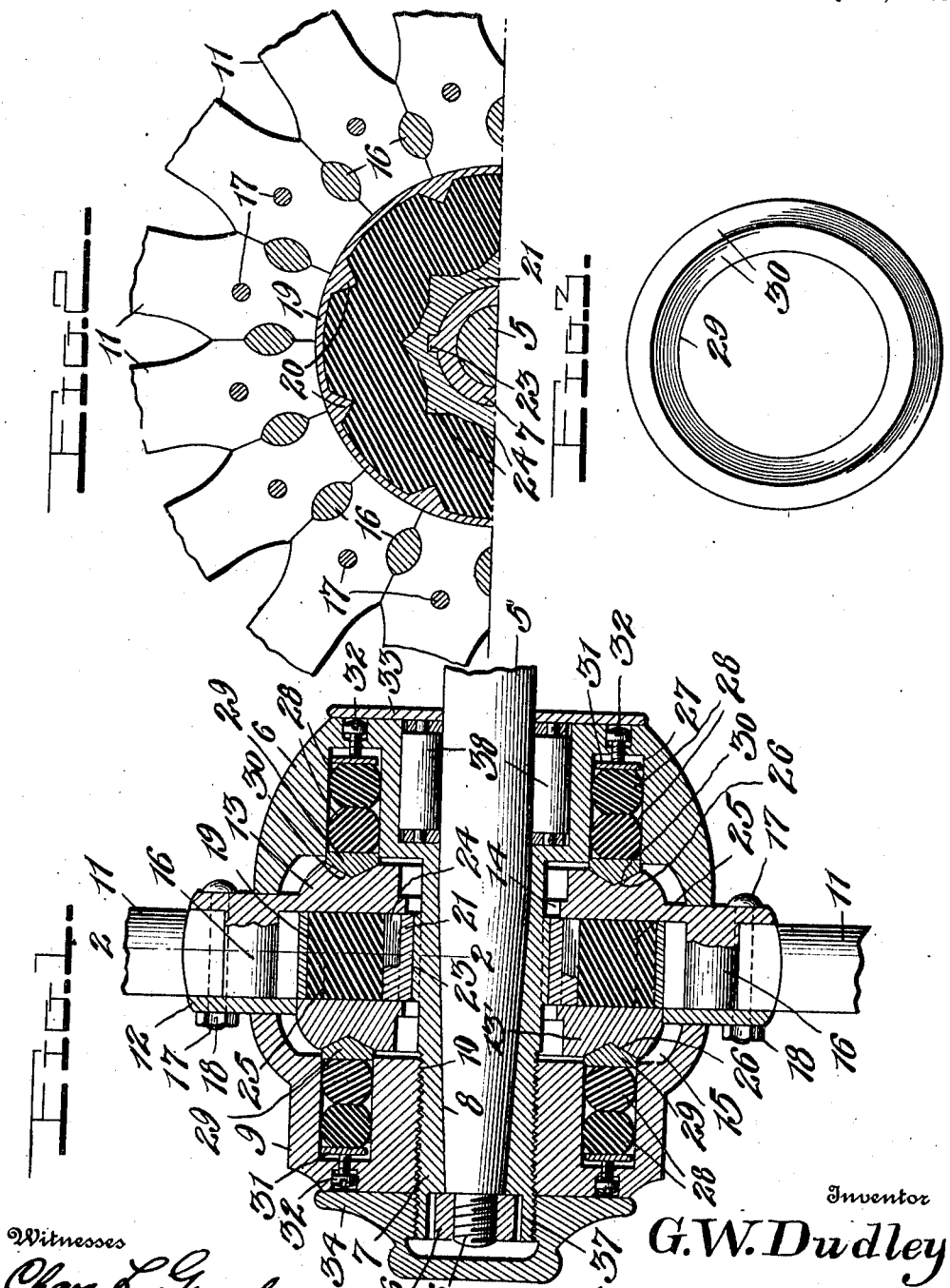

GEORGE W. DUDLEY, OF STAUNTON, VIRGINIA, ASSIGNOR OF ONE-FOURTH TO JAMES W. SHEETS, JR., OF STAUNTON, VIRGINIA.

VEHICLE-WHEEL.

993,043.

Specification of Letters Patent. Patented May 23, 1911.

Application filed December 24, 1910. Serial No. 599,219.

*To all whom it may concern:*

Be it known that I, GEORGE W. DUDLEY, a citizen of the United States, residing at Staunton, in the county of Augusta and State of Virginia, have invented certain new and useful Improvements in Vehicle-Wheels, of which the following is a specification, reference being had to the accompanying drawings.
This invention relates to improvements in vehicle wheels and more particularly to a wheel hub and has for its primary object to provide improved shock absorbing means arranged in the hub of the wheel whereby the vibration which would otherwise be imparted to the vehicle body is assimilated.

Another object of the invention resides in the provision of very simple and novel means for effectually overcoming and absorbing the strains which would otherwise devolve upon the wheel in its passage over rough and uneven ground, thereby materially lengthening its period of usefulness.

A still further object of my invention resides in the provision of a device of the above specified character arranged within the wheel hub and consisting of very few elements which may be obtained at small cost and easily and quickly assembled in operative position upon the axle spindle.

Still another object of the invention is to produce a shock absorber for vehicle wheels which is extremely positive in its action, durable in use and extremely efficient for the purpose in view.

With the above and other objects in view, the invention consists of the novel features of construction, combination and arrangement of parts hereinafter fully described and claimed, and illustrated in the accompanying drawings, in which—

Figure 1 is a vertical longitudinal section through a wheel hub showing the same arranged upon the axle spindle; Fig. 2 is a fragmentary section taken on the line 2—2 of Fig. 1; and Fig. 3 is a detail elevation of one of the expansible rings which are arranged in the wheel hub.

Referring in detail to the drawing 5 designates the axle spindle upon which the wheel is adapted to be arranged. This axle spindle is stationary and is mounted in the usual manner beneath the body of the vehicle. The vehicle wheel hub embodies in its construction, an inner section 6 which is formed with a longitudinally disposed sleeve 7 provided with a tapered bore 8 to receive the tapered end of the axle spindle 5. The other of the hub sections 9 is threaded upon the exteriorly screw threaded portion 10 of the sleeve 7. The vehicle wheel spokes 11 of which there may be any desired number, are not connected directly to the hub sections 6 and 9 but are rigidly fixed between the plates 12. One of these plates has integrally formed therewith an annulus 13. The other of said plates is in the form of a narrow ring and an annulus 13' similar to the annulus 13 is disposed within said ring. The annulus 13' is arranged upon the sleeve 7 of the hub section 6 and the plate 12 on which the annulus 13 is formed is also provided with an opening 14 which is of greater diameter than the exterior diameter of the sleeve 7 so as to permit of the movement of said plates radially with relation to the hub sections 6 and 9. These hub sections are provided in their opposed faces with recesses or chambers 15 to receive the annulus which is formed upon the plate 12, said chambers also being of greater diameter than the portions 13, 13' of the plate so as to permit of the free movement of the same in the chambers.

While the spokes 11 may be rigidly fixed between the plates 12 in any desirable manner, I preferably employ the keys or lugs 16 which are integrally formed upon one of the plates 12 and extend laterally therefrom. These lugs are substantially elliptical in cross sectional form and are disposed between the meeting faces of the ends of adjacent spokes. Through each of the spokes and the plates 12 the fastening bolts 17 extend upon which the nuts 18 are threaded. In this manner the wheel spokes are rigidly and firmly secured between the hub plates.

A circular plate 19 is arranged between the opposed faces of the plates 12 and is engaged with the extremities of the spokes 11. Upon this plate a plurality of inwardly extending V-shaped lugs or ribs 20 are formed. A similar plate 21 is keyed upon the tubular extension 7 of the hub section 6 as indicated at 23. This circular plate also has formed upon its outer face a plurality of lugs or ribs 24 which are similar in form to the ribs 20. A ring or annulus 25 of rubber or other resilient material is arranged between the circular plates 19 and 23, the V-shaped ribs 20 and 24 which are formed on said plate engaging in recesses in the outer and inner peripheral walls of said ring to prevent independent rotation or circular movement of the same. This intermediate rubber annulus provides a compressible cushion which normally maintains the plates 12 and the hub sections in concentric relation.

The annular portions 13, 13' of the plates 12 each has formed in its outer face an annular V-shaped groove 26. The walls of these grooves may be disposed at any desired inclination in accordance with the proportions of the wheel and the load to be sustained by the vehicle. The hub sections 6 and 9 are each formed with a longitudinally extending annular chamber 27 in which the rubber rings 28 are arranged. Two of these rings are arranged in the chamber of each hub section and are adapted to normally maintain a metal ring 29 in engagement with the annular portions 13, 13' of the plates 12. These rings are positioned in the ends of the chambers 27, and one face thereof has oppositely beveled or inclined surfaces as indicated at 30 to closely engage upon the walls of the V-shaped grooves 26 in the annular portions 13, 13' of the plates 12. The expansion of the rings 28 is sufficient to maintain enough pressure of the metal rings 29 in the grooves 26 to normally support the wheel against radial movement on the axle when moving over a smooth unbroken surface. As soon as the wheel enters a depression, however, or strikes an obstruction in the road, said wheel and the plates 12 to which the spokes are attached will move radially between the hub sections 6 and 9 and force the rings 29 into the longitudinal chambers 27 of the hub sections, thereby compressing the rings 28, the expansion of which returns the rings 29 into position in the grooves 26 after the wheel leaves the depression or has passed the obstruction. These rings 28 and the resilient ring 25 absorb all shock or jar at the hub of the wheel so that it is not transmitted to the body of the vehicle. An annular plate 31 is also arranged in each of the chambers 27 of the hub sections and is adapted to regulate the pressure of the resilient pairs of rings 28, said plates being adjustable in the chambers by means of suitable screws 32 which are countersunk in the ends of the hub sections. A plate 33 is arranged over the inner end of the hub and is suitably fixed thereto. The outer hub section 9 has engaged therewith a cap 34 which is threaded on the end of the sleeve 7. This cap provides an additional means of security for the hub section and also gives an ornamental finish to the hub. The end of the axle spindle is formed with the usual threaded stud 35 upon which the nut 36 is engaged and disposed in a recess 37 in the end of the sleeve 7.

By forming the annulus 13' separate from the plate 12, the hub section 9 may be removed together with the annulus 13' so that the resilient annular member 25 may be removed and replaced by another, without necessitating the removal of the plates 12.

As shown in the drawing suitable roller bearings 38 may be provided in the hub section 6 to engage upon the periphery of the axle spindle and reduce the friction to a minimum.

From the foregoing it will be seen that I have devised a vehicle wheel having a hub of such construction that the parts thereof may be easily and quickly assembled in position upon the axle spindle and all vibration or shock absorbed, the wheel being yieldingly held for radial movement upon the spindle. The expansible rings 29 which are arranged in the hub and engaged with the fixed plates carried by the wheel, will give under the slightest pressure, it being understood of course that the resiliency of the rings 28 is regulated in accordance with the weight of the vehicle body and the weight of the load. The entire weight of the body and load devolves upon the inclined surfaces 30 of the movable rings in the normal operation of the device. This renders the absorber very sensitive and of great efficiency in use.

While I have shown and described the preferred construction and arrangement of the various elements embodied in the preferred form of my invention, it will be understood that the device is susceptible of many modifications without departing from the essential feature or sacrificing any of the advantages involved therein.

Having thus described the invention what is claimed is:—

1. In a device of the character described, the combination with an axle, of a wheel mounted thereon embodying a sectional hub disposed upon opposite sides of the wheel proper, said wheel proper being radially movable between the hub sections when subjected to abnormal pressure, each of said hub sections having a longitudinal annular chamber therein, an annulus movably arranged in each of said chambers, resilient rings arranged in the chamber of each hub section and acting to force the annulus therein into engagement with the wheel proper to yieldingly sustain the same in concentric relation to the wheel axle, a circular plate in each of the hub chambers, and adjusting screws to force said plates against the resilient rings to regulate the pressure thereof upon the annuli carried by the hub sections in accordance with the load carried by the vehicle.

2. In a device of the character described, the combination with an axle, of a wheel mounted thereon, said wheel embodying a hub formed in two sections, one of said sections having a sleeve formed thereon to receive the axle, said sleeve having threaded engagement in the other hub section, the wheel proper being radially movable upon said sleeve between the hub sections, each of said hub sections having a chamber formed in one end, an annulus arranged upon opposite sides of the wheel proper and movable in said hub chambers, a resilient ring disposed between the annuli carried by said wheel, a metallic ring engaging the ends of the spokes of the wheel having projections extending into said ring, a second metallic ring keyed upon the sleeve of the hub section and also provided with projections extending into the resilient ring, said projections maintaining said resilient ring in position against circular movement, and means longitudinally movable in each of the hub sections engaging with the annuli carried by the wheel proper to normally maintain said wheel proper in concentric relation to the axle.

3. In a device of the character described, the combination with an axle, of a wheel mounted to rotate thereon, said wheel embodying a hub formed in two sections, said sections being disposed upon opposite sides of the wheel proper, said wheel proper having radial movement upon the axle with respect to the hub sections, an annulus arranged on opposite sides of the wheel proper and movable therewith, each of said hub sections having an annular longitudinal chamber, a metallic ring movable in each of the chambers, the face of each of the annuli and one face of each ring having oppositely inclined surfaces, and means arranged in each of the annular chambers of the hub sections, engaging said rings to normally hold the inclined faces thereof in engagement with the inclined faces of the annuli and sustain the wheel proper normally in concentric relation between the hub sections.

4. In a device of the character described, the combination with an axle, of a vehicle wheel mounted to rotate upon said axle, said wheel embodying a sectional hub, one of the hub sections being arranged upon each side of the wheel proper, a sleeve integrally formed upon one hub section to receive the axle spindle, said sleeve being threaded into the other hub section, the wheel proper being radially movable upon said sleeve between the hub sections, an annulus on each side of the wheel proper movable with said wheel within the hub sections, each of said hub sections having an annular longitudinal chamber, a ring movable in each of said chambers, said annuli each having a V-shaped groove in its face, said movable rings having one of their faces inclined in opposite directions from the longitudinal center of the ring for engagement with the faces of said grooves, a pair of resilient rings arranged in the annular chamber of each of the hub sections, said rings normally acting to force the movable metallic rings into engagement with the annuli and sustain the wheel proper in concentric relation to the hub sections, and means for regulating the pressure of said resilient rings upon the metallic ring in accordance with the load carried by the vehicle.

In testimony whereof I hereunto affix my signature in the presence of two witnesses.

GEORGE W. DUDLEY.

Witnesses:
M. K. REEDER,
E. L. WHITE.